(12) United States Patent
De Echaniz et al.

(10) Patent No.: US 9,601,896 B2
(45) Date of Patent: Mar. 21, 2017

(54) METHOD AND SYSTEM FOR ADJUSTING THE ALIGNMENT OF A PHOTONIC BEAM

(71) Applicant: Jeanologia, S.L., Paterna, Valencia (ES)

(72) Inventors: Sebastian R. De Echaniz, Sant Quirze Del Valles (ES); José M. Ibánez Barón, Barcelona (ES); Ramon Sans Ravellat, Sant Quirze Del Valles (ES)

(73) Assignee: Jeanologia, S.L., Paterna, Valencia (ES)

( * ) Notice: Subject to any disclaimer, the term of this patent is extended or adjusted under 35 U.S.C. 154(b) by 0 days.

(21) Appl. No.: 14/346,592

(22) PCT Filed: Sep. 21, 2012

(86) PCT No.: PCT/IB2012/055022
§ 371 (c)(1),
(2) Date: Mar. 21, 2014

(87) PCT Pub. No.: WO2013/042074
PCT Pub. Date: Mar. 28, 2013

(65) Prior Publication Data
US 2014/0233044 A1  Aug. 21, 2014

(30) Foreign Application Priority Data
Sep. 22, 2011 (ES) .................................. 201131529

(51) Int. Cl.
*G01B 11/00* (2006.01)
*H01S 3/101* (2006.01)
(Continued)

(52) U.S. Cl.
CPC ............ *H01S 3/101* (2013.01); *B23K 26/043* (2013.01); *G01B 11/14* (2013.01); *G01B 11/272* (2013.01)

(58) Field of Classification Search
CPC ....... G01B 11/14; G01B 11/00; G01B 11/272; G01B 11/27; H01S 3/101; G01C 15/00; G01D 21/00
(Continued)

(56) References Cited

U.S. PATENT DOCUMENTS 4,627,725 A   12/1986 Nishio et al.
5,666,450 A * 9/1997 Fujimura et al. ............... 385/93
(Continued)

FOREIGN PATENT DOCUMENTS

DE   102008037176 A1   3/2010
WO   WO-2009066918 A2  5/2009

OTHER PUBLICATIONS

International Search Report dated Feb. 28, 2013, relating to International Application No. PCT/IB2012/055022.
(Continued)

*Primary Examiner* — Tarifur Chowdhury
*Assistant Examiner* — Isiaka Akanbi
(74) *Attorney, Agent, or Firm* — Maier & Maier, PLLC

(57) ABSTRACT

The method comprises:
  detecting the positions $(u_o, v_o)$ and $(u_1, v_1)$ of said photonic beam (L) according to the coordinate axes X, Y on a first and second plane XY, which cut an optical axis X at a first and second point, respectively;
  comparing the results of said positional detections $(u_o, v_o)$ and $(u_1, v_1)$, and:
    if there are discrepancies which lie outside the margin of error (p), adjusting the angle of the photonic beam (L) according to the angle α and/or the angle β in order to overcome said discrepancies; or
    if there are no discrepancies which lie outside said margin of error (p), considering the angle of said photonic beam (L) as being properly adjusted.
(Continued)

The system is adapted to implement the method set out by the invention.

8 Claims, 2 Drawing Sheets

(51) Int. Cl.
*B23K 26/04* (2014.01)
*G01B 11/27* (2006.01)
*G01B 11/14* (2006.01)

(58) Field of Classification Search
USPC .................................. 356/399–401, 601–614
See application file for complete search history.

(56) References Cited

U.S. PATENT DOCUMENTS

| | | | |
|---|---|---|---|
| 5,969,851 A | 10/1999 | Clark et al. | |
| 6,023,337 A | 2/2000 | Schiff | |
| 6,168,319 B1* | 1/2001 | Francis | G02B 6/2937 385/55 |
| 6,356,348 B1 | 3/2002 | Lysen et al. | |
| 6,590,658 B2* | 7/2003 | Case | G02B 6/2555 250/548 |
| 8,938,140 B2* | 1/2015 | Willsch | G01D 5/35303 385/26 |
| 2004/0008339 A1* | 1/2004 | Koishi et al. | 356/153 |
| 2006/0187454 A1* | 8/2006 | Shih et al. | 356/400 |
| 2010/0007884 A1* | 1/2010 | Lin et al. | 356/399 |

OTHER PUBLICATIONS

EP Office Action dated Nov. 16, 2016, in connection with corresponding EP Application No. 12 798 832.7 (7 pgs.).

M. Griot, "Introduction to Laser Beam and Spectral Measurement 11", pp. 11.1-11.24 (24 pgs.), XP55317159.

* cited by examiner

METHOD AND SYSTEM FOR ADJUSTING THE ALIGNMENT OF A PHOTONIC BEAM

TECHNICAL FIELD

The present invention generally concerns, in a first aspect, a method for adjusting the alignment of a photonic beam, and more specifically, a method comprising the detection of the position of the photonic beam in two XY planes spaced out along an optical axis Z, and, should there be discrepancies in the positions of the two detections, make an adjustment to the axis of the photonic beam A second aspect of the invention concerns a system for adjusting the alignment of a photonic beam adapted to implement the method of the first aspect.

PRIOR ART

For most equipment for laser marking, cutting, and soldering, or any optical system in general, it is necessary to adjust the outgoing laser beam or any photonic source with respect to a certain optical, electro-optical, or opto-mechanical system.

The current solution is the use of subjective adjustments, whether by using localizing targets, thermal papers, or in general, any system that requires an operator, who must decide whether the optical system is adjusted.

In most situations, this implies that the systems are not perfectly aligned, or that usually, extensive training and adjustment maneuvers are needed to optimally adjust the alignment.

In general, the very design of optical systems which have to be adjusted according to a photonic source (a laser) modifies the trajectory of said source, leaving it out of alignment with respect to the optical axis Z. In general, said trajectory is misaligned in relation to the axis of the X, Y coordinates, which are perpendicular to said optical axis Z, and with two $\alpha$, $\beta$ angles with respect to the optical axis Z, which is the axis on which the adjustment is to be performed.

Explanation of the Invention

It seems necessary to offer an alternative to this state of the art, in order to close these gaps, and offer an adjustment mechanism which is more advantageous than the current ones, and which makes it possible, in some situations, to remove the need for an operator.

With this end in mind, the present invention relates, in a first aspect, a method for adjusting the alignment of a photonic beam, or laser beam, where said photonic beam is initially misaligned with respect to the optical axis Z, according to at least one of the two X, Y coordinate axes, which are perpendicular to said optical axis Z, and/or at least one of two angles $\alpha$, $\beta$, which exist in XZ and YZ planes, respectively.

Unlike conventional methods, the method proposed by the present invention consists of, and is characterized by, the execution of the following steps in sequence:
 a) detecting the position of said photonic beam according to said two X, Y coordinate axes, on a first XY plane, which cuts said optical axis Z with an initial point;
 b) detecting the position of said photonic beam according to said two X, Y coordinate axes, on a second XY plane, which cuts said optical axis Z with a second point, distanced from said first point;
 c) comparing the results of the position detections, and:
  c1) if there are discrepancies between said positions, which lie outside a margin of error, adjusting the angle of the photonic beam according to the angle $\alpha$ and/or the angle $\beta$, in order to overcome said discrepancies; or
  c2) if there are no discrepancies outside said margin of error, considering the angle of the photonic beam to be properly adjusted.

According to an exemplary embodiment, the method comprises the repetition of said sequence of steps a) to c) one or more times until the sub-step c2) is reached, at which point the photonic beam's angle is correctly adjusted.

According to another exemplary embodiment, the method can execute more than two detections of the photonic beam's positioning according to said two X,Y coordinate axes, on the respective XY planes that cut the optical axis Z at different points, which are distanced from each other, and carrying out said step c) for the results obtained during said detections.

The method also comprises, according to an exemplary embodiment, the execution of a positional adjustment of the photonic beam according to the X coordinate axis and/or the Y coordinate axis if the positional detections of step a) and/or step b) indicate that the photonic beam's position is misaligned with respect to at least one of the X,Y coordinate axes, outside of the margin of error, in order to correct said positional misalignment.

This positional adjustment is carried out, in the exemplary embodiment, after said sub-step c2), after said step a) and before said step b), or after said step b) either automatically or manually.

In one exemplary embodiment, the method comprises the execution of said steps a) to c) automatically.

In another exemplary embodiment, the method comprises the execution of at least part of said step c) manually, including the comparison between the results of the positional detections and/or the adjustment of angles in sub-step c1) and/or said sub-step c2).

The method comprises, as seen in an exemplary embodiment, the ability to carry out said adjustment of the alignment of said photonic beam, either of its position or its angle, using an opto-mechanical adjustment system with four degrees of freedom (X, Y, $\alpha$, $\beta$).

As for what is referred to as detections in steps a) and b), the method comprises, in the exemplary embodiment, the ability to carry out the detections with its own mobile sensor, moving it along the optical axis Z (either manually or in a servo-controlled manner) between the positions of said first and second XY planes, or to carry them out with two sensors, each one of them situated in one of the said positions which occupy said first and second XY planes.

A second aspect of the invention concerns a system for adjusting the alignment of a photonic beam, where said photonic beam is initially misaligned with respect to an optical axis Z, which defines its trajectory, with respect to at least one of the two X,Y coordinate axes, which are perpendicular to said optical axis Z, and/or to at least one of the two angles $\alpha$, $\beta$, which exist in planes XZ and YZ, respectively.

Unlike conventional adjustment systems, the one proposed by the second aspect of the invention comprises:
 means of detection in order to:
  detect the position of said photonic beam according to said two X,Y coordinate angles, on a first plane XY, which cuts said optical axis Z at a first point; and detect the position of said photonic beam according to said two X, Y coordinate axes, on a second XY plane, which cuts said optical axis Z at a second point distanced from the said first point;

means of comparison to compare the results of said positional detections;

means of adjusting angles in order to adjust the angle of the photonic beam according to the angle α and/or the angle β;

means of control, in connection to at least the said means of comparison, and intended to:

at least collaborate in the said angle adjustment of the photonic beam according to the angle α and/or the angle β, if the means of comparison determine that there are discrepancies between said positional detection which lie outside of the margin of error, with the goal of overcoming said discrepancies; and determine that said photonic beam's angle is properly adjusted, if the means of comparison determine that there are no discrepancies that lie outside of the margin of error.

The method proposed by the first aspect of the invention can be implemented through the system proposed by the second aspect or through a more simple system, in the case of the exemplary embodiment mentioned earlier in which at least part of the steps involved in the method are carried out manually. A simpler system like that one does not require the means of comparison described, if said comparison is partly carried out manually by an operator, and/or the means of control mentioned, if the angle adjustment and/or the assessment that the photonic beam is correctly adjusted are done manually by an operator.

According to an exemplary embodiment, the means of control are intended to automatically control the means of adjusting the angle in order to automatically execute said adjustment of the photonic beam's angle according to the angle α and/or the angle β.

According to another exemplary embodiment, the means of control are designed to provide an operator with information relating to the angle adjustment, said means of adjustment being carried out manually by said operator, based on said information about the angle adjustment in order to carry out said manual angle adjustment to the photonic beam, according to the angle α and/or the angle β.

The said means of detection mentioned above include, for one exemplary embodiment, a mobile sensor which moves up and down the optical axis Z (being operated manually or servo-controlled) between the positions of said first and second XY planes, in order to carry out the detection of the positions in both of those XY planes.

The system comprises, according to one embodiment, a computing unit including said means of comparison and said means of control, which is connected and controls said means of detection in order to execute said positional detections and in order to receive information relating to the result of those detections, and in order to implement at least steps a), b) and c2) of the method of the first aspect of the invention.

In one exemplary embodiment, said computation unit also implements sub-step c1) of the method of the first aspect, automatically controlling the means of adjusting angles.

The system comprises, in one exemplary embodiment, means of adjusting positioning in order to adjust the position of the photonic beam according to the axis of the X coordinate and/or the axis of the Y coordinate, and said means of control are connected to said means of detection, and they are intended to at least collaborate during said positional adjustment, if the detections made by the means of detection indicate that the photonic beam's position is misaligned with respect to at least one of the X,Y coordinate axes, outside of the margin of error.

The unit of computation mentioned, according to one exemplary embodiment, controls said means of adjusting the photonic beam's position.

In one exemplary embodiment, the computational unit implements a program which manages the regulatory process, which comprises at least two or more methods of functioning, according to the complexity of the opto-mechanical system included in the means of adjusting the angle and the position:

a. Manual method, in which the operator is informed about which direction the dials are to be turned and to what extent.

b. Automatic method, in which the program itself includes a motorized system which is responsible for moving each axis, until a precise adjustment of the beam's optical path is reached.

BRIEF DESCRIPTION OF THE DRAWINGS

The previous features as well as other features and characteristics of the system will be better understood from the following detailed description of exemplary embodiments with reference to the drawings included, which should be taken as illustrative and are not limitative, in which.

DETAILED DESCRIPTION OF EXEMPLARY EMBODIMENTS

Figure 1:
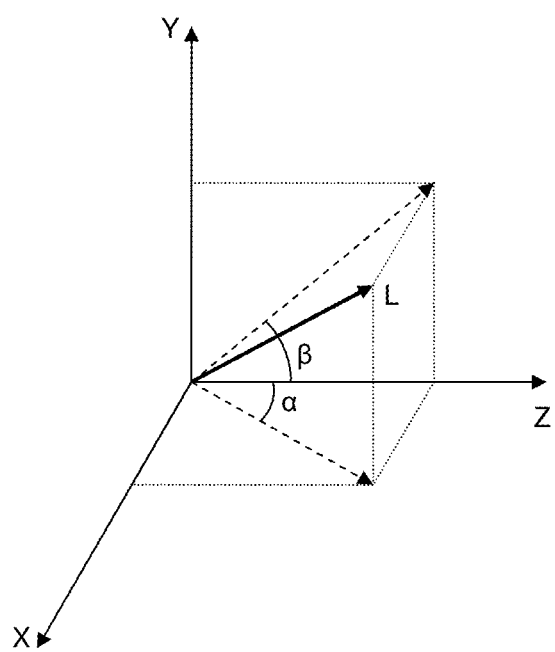
FIG. 1 illustrates a coordinate system which consists of the photonic beam L, the axes X and Y, and the angles α, β of the misalignment or misadjustment of the photonic beam L with respect to the optical axis Z.
Figure 2:
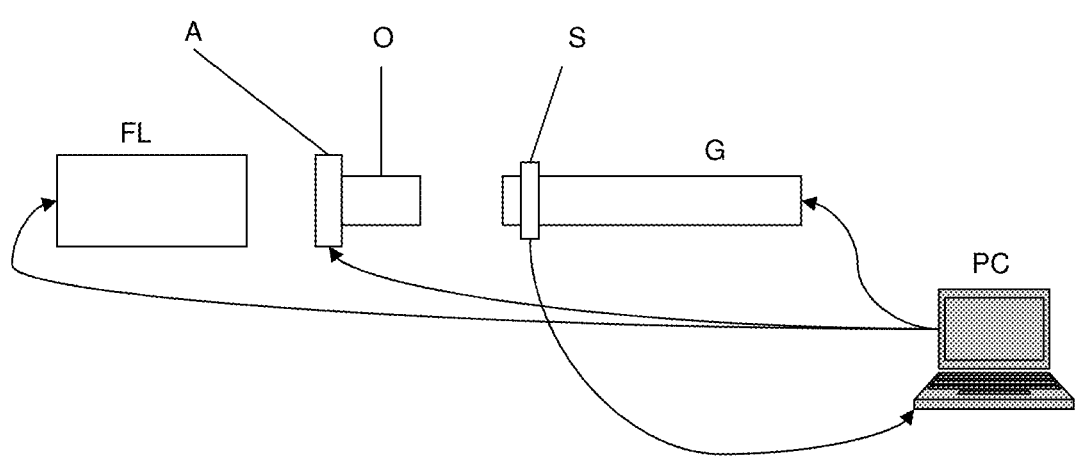
FIG. 2 schematically illustrates the system proposed by the second aspect of the invention for an exemplary embodiment.

FIG. 2 illustrates the system proposed by the second aspect of the invention, together with a source of laser light FL, to create an exemplary embodiment in which the means of detection include a mobile sensor S, which moves up and down the optical axis Z, along the guide means G, between the positions which are occupied by the previously described first and second XY planes, in order to carry out positional detections in both XY planes.

Said mobile sensor S is connected with the computational unit PC of the means of control, so that it is controlled by that unit, and it supplies it with the positional readings which it carries out, in order that this unit carry out the comparisons between those readings, and also adjust the angle according to the angle α and/or the angle β, as well as carry out positional adjustments according to the X coordinate axis and/or the Y coordinate axis of the photonic beam L, or consider the beam as correctly adjusted, if that is the case.

Such angular and positional adjustments are carried out through an opto-mechanical adjustment system with four degrees of freedom, which allows regulation of the two axes X,Y and the two angles α, β, independently from one another, and which is illustrated in FIG. 2 with the reference A, which is associated with an optical area of correction O, and is controlled by the computational unit PC, with which it is connected.

The computational unit PC is also connected to the source of laser light FL, in order to control its operation.

Figure 3:
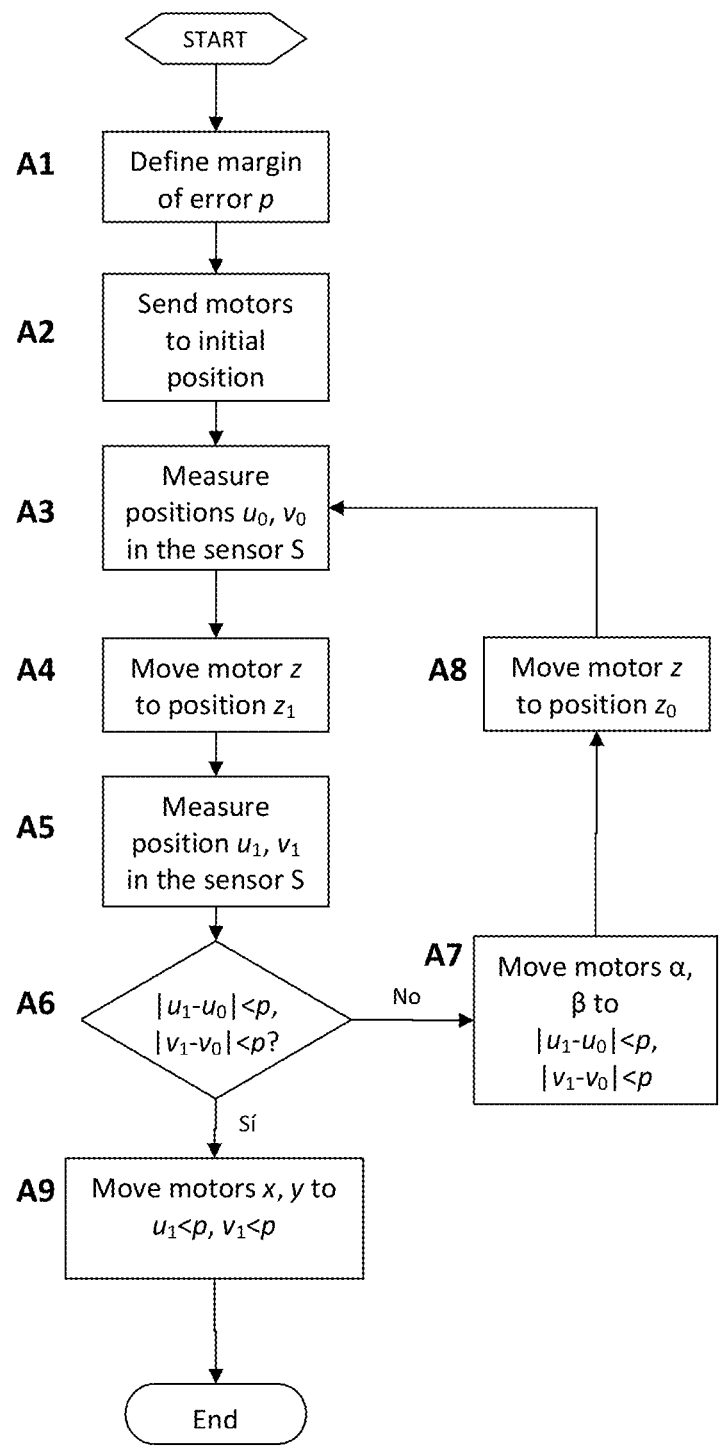
FIG. 3 is a flow diagram which illustrates an exemplary embodiment of the method proposed by the first aspect of the invention.

FIG. 3 illustrates an exemplary embodiment of the method proposed by the first aspect of the invention, applied to an automatic adjustment system with motors x, y to adjust the position according to the coordinate axes X and Y and with motors α and β to adjust the angle according to the angle α and/or the angle β, as well as a motor z to move the sensor S along the guide means G.

According to this exemplary embodiment, the adjustment of the laser takes place through a recursive method of measuring and correcting. With this method, the position of the laser is measured with a sensor S in two positions along a trajectory which is defined by the optical path Z. Then, the optical system is corrected so that the second measurement is equal to the first one (within a margin of error.) This is repeated until the second measure no longer requires correction.

The process which then adjusts the laser is as follows:

First, the laser FL is installed in a frame which is calibrated and aligned with the axis of movement of the sensor S. Afterwards, the actions described in the flow diagram in FIG. 3 are carried out, that is to say:

A1: A margin of error p is defined for the alignment.

A2: The adjustments to the optical system are placed in their initial positions and the sensor S is placed in its initial positions, or position $z_0$, sending the motors x, y, α, β y z to their initial positions.

A3: A measurement is taken of the laser L on the sensor S, which is indicated as position $u_o$, $v_o$, according to the axes X,Y in the said initial position $z_0$.

A4: The sensor S is placed in the second position, or position $z_1$, activating the motor z.

A5: The position of the beam L is measured again on the sensor S, and indicated as position $u_1$, $v_1$, according to the axes X,Y in said second position $z_1$ A6: Both positional detections are compared, and:

If the difference in the measurements does not fall within the margin of error p:

A7: The angular adjustments to the optical system are adjusted, activating the motors α and β until both measurements fall within the margin of error p; and A8: The motor z is activated in order to move the sensor S back to its initial position $z_0$, and the system returns to step A3.

If the difference between the measurements does fall within the margin of error p:

A9: The positional adjustments made to the optical system are corrected by activating the motors x, y, until the sensor S indicates that the position of the beam L falls within the margin of error p.

After step A9, the optical system is aligned.

One skilled in the art could introduce changes and modifications to the exemplary embodiments described without departing from the scope of the invention as defined in the appended claims.

The invention claimed is:

1. A method for adjusting the alignment of a photonic beam, where said photonic beam is initially misaligned with respect to an optical axis Z, according to at least one of the two coordinate axes X, Y which are perpendicular to the optical axis Z, and/or at least one of the two angles α, β, which exist in XZ and YZ planes, respectively, defined between an orthogonal projection of the photonic beam and the optical axis Z, the method comprising the execution of the following steps in sequential order and automatically:

detecting a first position of the photonic beam according to the two X,Y coordinate axes on a first plane XY which intersects the optical axis Z at an initial point;

detecting a second position of said photonic beam according to the two X, Y coordinate axes on a second plane XY which intersects the optical axis Z at a second point which is distanced from the initial point wherein the steps for detecting are undertaken by first and second sensors, wherein each of the first and second sensors are in respective positions in the first and second XY planes;

comparing coordinates of the first position with coordinates of the second position and, if there are discrepancies between the coordinates of the first position and the coordinates of the second position which lie outside a given margin of error, adjusting the angle of the photonic beam according to the angle α and/or the angle β in order to overcome said discrepancies, or if there are not any discrepancies which lie outside of the given margin of error considering said photonic beam as being properly angularly adjusted, wherein said sequential detections are performed directly on the photonic beam path, without modifying the trajectory thereof, and wherein each of α and β are between −90 degrees and 90 degrees of Z.

2. A method as set forth in claim 1, further comprising:

repeating the steps for detection steps and the step for comparing if, and until, there are not any discrepancies outside of the margin of error such that the photonic beam is properly angularly adjusted.

3. A method as set forth in claim 1, further comprising:

re-adjusting the position of the photonic beam along one or both of the X-axis or the Y-axis to coordinate one or both of the X-axis and the Y-axis if the steps for positional detections indicate that the photonic beam is positionally misaligned in relation to at least one of the X,Y coordinate axes outside a margin of error, in order to correct said positional misalignment, wherein the step of adjusting the position of the photonic beam occurs:

after there are no discrepancies which lie outside of the given margin of error;

after the step of detecting said first position of the photonic beam and before the step of detecting said second position of the photonic beam; or after both the steps of detecting the first position of the photonic beam and the step of detecting the second position of the photonic beam.

4. A method as set forth in claim 3, wherein the step of adjusting the position of the photonic beam is automatically executed.

5. A method as set forth in claim 1, wherein the step of adjusting the position of the photonic beam, in terms of both angle and position, is executed via an opto-mechanical adjustment system with four degrees of freedom.

6. A method as set forth in claim 1, wherein the photonic beam is a laser beam.

7. A system for adjusting the alignment of a photonic beam, where said photonic beam is initially misaligned with respect to an optical axis Z, which defines its trajectory using at least one of the two X,Y coordinate axes, which are perpendicular to said optical axis Z, and/or at least one of the two angles α, β, which exist on planes XZ and YZ respectively, defined between an orthogonal projection of the photonic beam and the optical axis Z, this system comprising:

a mobile sensor movably positioned about the optical axis Z along a guide member and movable between first and second positions occupied by first and second XY planes, the mobile sensor adapted to carry out positional detections in each of a first and second XY planes that intersect the optical axis Z at an initial point and at a second point which is distanced from the first point wherein the mobile sensor further comprises first and second sensors, wherein each of the first and second sensors are in respective positions in the first and second XY planes;

means of control including one or more processors connected to said mobile sensor to execute the positional detections and providing a comparison of the results of said positional detections;

motors providing automatically an angular adjustment to adjust the angle of the photonic beam according to the angle $\alpha$ and/or the angle $\beta$, if the means of control determine from said comparison that there are discrepancies between said positional detections which lie outside a margin of error, in order to overcome said discrepancies and to determine that the angle of said photonic beam is correctly adjusted, if the comparison determines that there are not any discrepancies which lie outside said margin of error.

8. A method for adjusting the alignment of a photonic beam, where said photonic beam is initially misaligned with respect to an optical axis Z, according to at least one of the two coordinate axes X,Y which are perpendicular to said optical axis Z, and/or at least one of the two angles $\alpha$, $\beta$, which exist on planes XZ and YZ respectively, defined between an orthogonal projection of the photonic beam and the optical axis Z, the method comprising the execution of the following steps in sequential order and automatically:

detecting a first position of said photonic beam according to said two X, Y coordinate axes on a first plane XY which intersects the optical axis Z at an initial point;

detecting a second position of said photonic beam according to the two X, Y coordinate axes on a second plane XY which intersects the optical axis Z at a second point which is distanced from the initial point wherein the steps for detecting are undertaken by first and second sensors, wherein each of the first and second sensors are in respective positions in the first and second XY planes;

comparing the coordinates of the first position and the second position, and if the difference between the first position and the second position lies outside a given margin of error, adjusting the angle of the photonic beam according to the angle $\alpha$ and/or the angle $\beta$ in order to overcome said discrepancies, or if there are no discrepancies which lie outside of said given margin of error considering said photonic beam as being properly angularly adjusted;

wherein said sequential detections are performed directly on the photonic beam path, without modifying the trajectory thereof; and wherein the step of adjusting the position of the photonic beam, in terms of both angle and position is executed via an opto-mechanical adjustment system with four degrees of freedom, and wherein each of $\alpha$ and $\beta$ are between −90 degrees and 90 degrees of Z.

* * * * *